Figure 3:
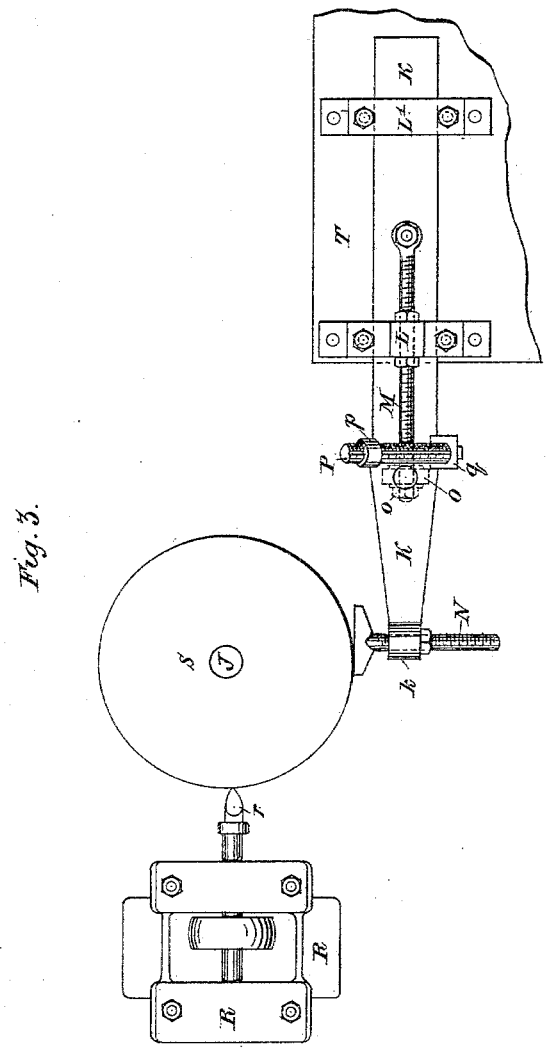

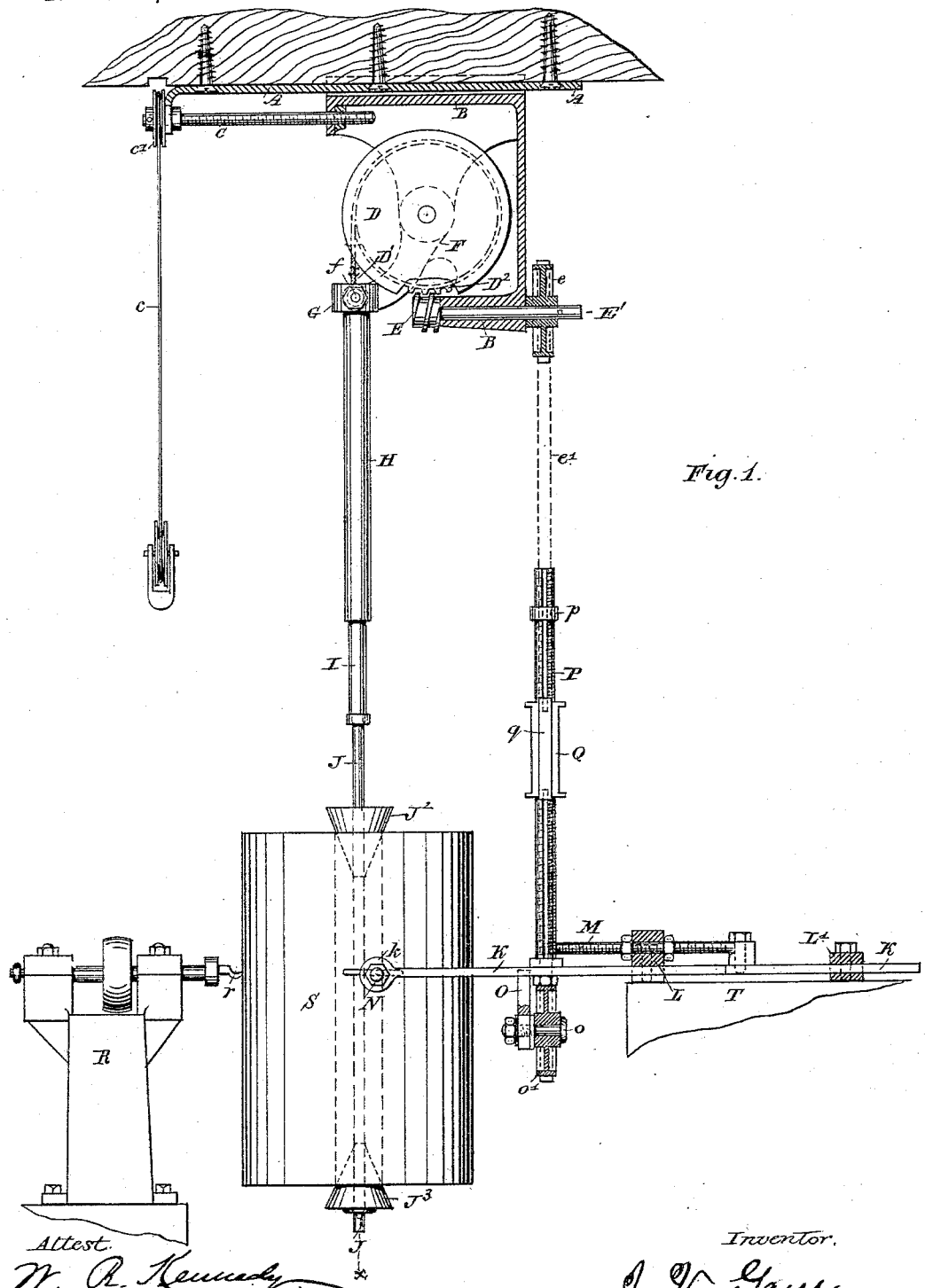

(No Model.) 3 Sheets—Sheet 2.
J. V. GANE.
MACHINE FOR BORING BRUSH BODIES.
No. 378,131. Patented Feb. 21, 1888.
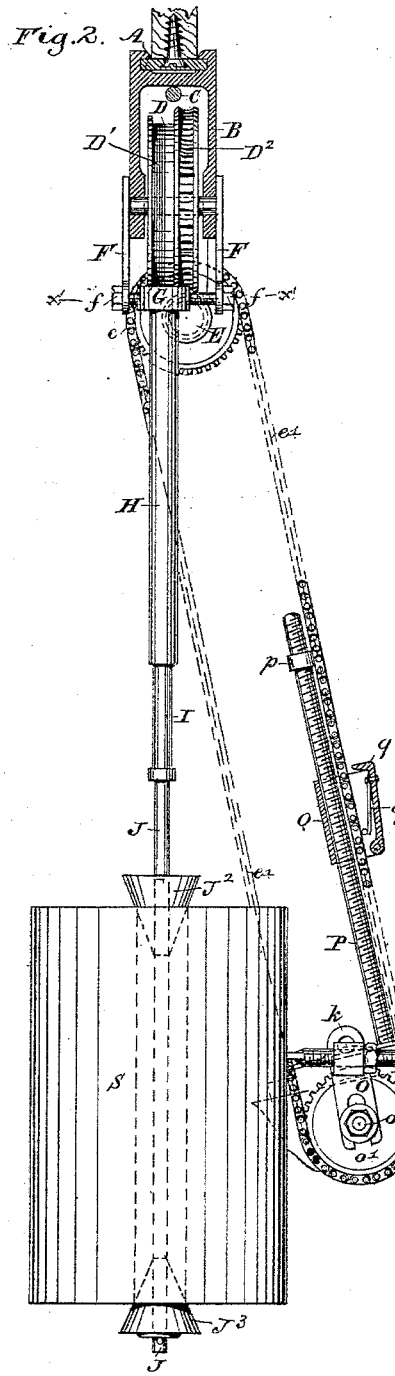
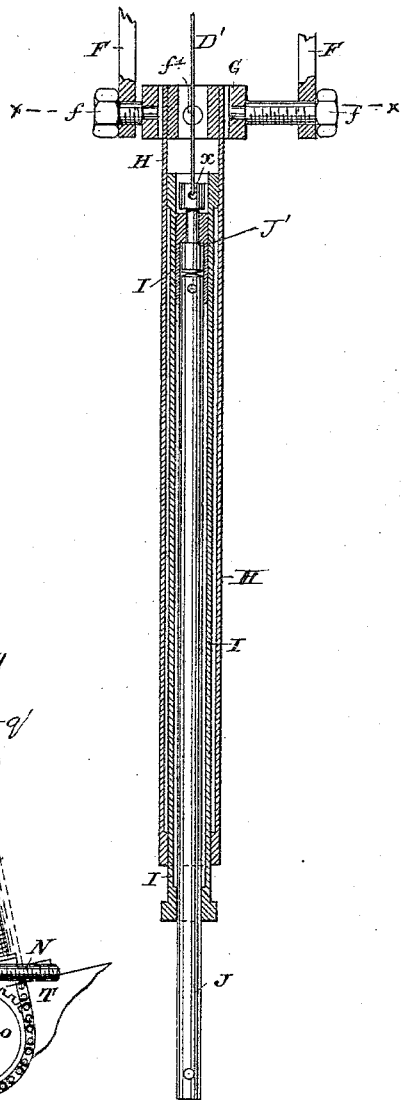
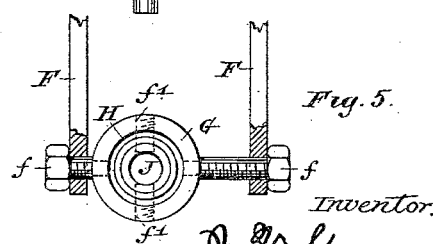
Attest:
W. R. Kennedy
W. H. Shipley
Inventor.
J. V. Gane
By P. T. Dodge
Atty (No Model.) 3 Sheets—Sheet 3.

J. V. GANE.
MACHINE FOR BORING BRUSH BODIES.

No. 378,131. Patented Feb. 21, 1888.

Attest.
W. A. Kennedy
W. H. Shipley

Inventor.
J. V. Gane.
By P. T. Dodge,
Atty.

UNITED STATES PATENT OFFICE.

JEAN V. GANE, OF PARIS, FRANCE, ASSIGNOR TO FREDERICK JOHN PAGE AND CHARLES FOUNTAIN PAGE, OF NORWICH, ENGLAND.

MACHINE FOR BORING BRUSH-BODIES.

SPECIFICATION forming part of Letters Patent No. 378,131, dated February 21, 1888.

Application filed January 5, 1887. Serial No. 223,473. (No model.) Patented in England October 21, 1886, No. 13,448.

*To all whom it may concern:*

Be it known that I, JEAN VICTOR GANE, a citizen of the Republic of France, residing at Paris, in France, have invented a new and useful Machine for Boring Brush-Bodies, (patented in England, No. 13,448, dated October 21, 1886, sealed August 23, 1887,) of which the following is a specification.

The aim of my invention is to provide an apparatus by which brush-bodies may be properly supported and quickly adjusted during the operations of boring the tuft-receiving holes therein, or during the operation of inserting the tufts into said holes, and is intended, more particularly, for use in the manufacture of brushes having cylindrical bodies with the tufts arranged radially therein, although it is to some extent applicable in the manufacture of brushes having bodies of flat or other forms.

In the accompanying drawings I have illustrated my machine as adapted and applied to the manufacture of cylindrical brushes.

Figure 1 represents a side elevation of the machine, certain of the minor portions being represented in section. Fig. 2 is an edge view of the machine with minor portions in section. Fig. 3 is a top plan view of the lower portions of the apparatus. Fig. 4 is a longitudinal central section through the telescopic support for the brush-body on the line $x\ x$ of Fig. 1. Fig. 5 is a horizontal section on the line $x'\ x'$ of Figs. 2 and 4.

My machine consists, essentially, of a pendent telescopic spindle on which the brush-body is supported, combined with means for adjusting said spindle vertically, and with guides or supports which co-operate with the brush-body to hold the same in proper relation to the boring or tuft-inserting devices.

While I have for clearness of explanation thus illustrated an ordinary form of boring-machine in connection with my apparatus, it is to be understood that the apparatus may be used in connection with boring or tuft-inserting mechanisms of any approved form, these matters being foreign to the present invention.

Referring to the drawings, A represents a horizontal guide-plate fixed rigidly in an overhead position on any suitable support; B, a cast-iron frame adapted to engage the edges of said plate and to slide horizontally thereon under the influence of an adjusting-screw, C, one end of which is threaded into the movable frame, while the other is swiveled in the guide-plate. The screw is provided with a grooved pulley, $c'$, supporting an endless belt, $c$, which extends downward within convenient reach of the attendant, its lower end being provided with a weighted pulley to keep it in position.

G represents a horizontal ring connected by horizontal pivots $f$ to arms F, forming parts of the frame B. This ring is also connected by horizontal pivots $f'$, at right angles to those above mentioned, to the upper end of a tube, H, the two series of pivots and the ring constituting an ordinary universal joint of the form known as a "gimbal-joint," by which the tube H is sustained and its lower end permitted to swing freely in all directions. The tube H contains a second tube, I, arranged to slide therein, and this inner tube in turn incloses a rod, J, the lower end of which is projected and exposed to receive and sustain the brush-body. The two tubes and the rod constitute jointly an extensible or telescopic spindle. The upper end of the rod J is connected by an ordinary swivel-joint, J', to the lower end of a suspending wire or chain, D', attached to and arranged to wind upon a drum, D, journaled in the frame B. The drum D is provided on one side with a series of worm-teeth, $D^2$, which engage a worm, E, on a horizontal shaft, E', mounted in the frame B, so that the rotation of the worm turning the drum will cause the wire to raise or lower the brush-supporting rod J, as occasion may require. The worm serves when at rest as a stop or detent to hold the drum against rotation and maintain the lower end of the spindle at the height to which it may be adjusted. The means for turning the worm and controlling its movement, so as to raise or lower the spindle definite and equal distances, will be hereinafter described.

The cylindrical brush-body S, which it is the object of my machine to sustain, is provided with a central opening from end to end, so that it may be slipped endwise upon the rod J. In order to hold the body thus applied in position, the rod is provided with two conical sleeves, J² and J³, arranged to enter the ends of the body, as shown in Figs. 1 and 2. The cones admit of the brush-body being revolved around the rod or spindle to present its different sides to the boring-tool, hereinafter described. The lower sleeve may be held in position by a pin and the upper sleeve by gravity, or fastening devices of any suitable character, such as will suggest themselves to the intelligent mechanic, may be used to secure the cones in place.

The foregoing parts constitute jointly a mechanism adapted to sustain the brush-body in an upright position to move it horizontally and vertically, and to admit of its being rotated or moved laterally at will.

In Fig. 1 R represents an ordinary boring-machine with a horizontal spindle provided with a boring or drilling tool, r, to act upon the brush-body while it is suspended in position. This boring apparatus is located at one side of the position occupied by the brush-body, so that the axis of its spindle occupies a radial or approximately radial position with reference to the center of the brush-body, or substantially so.

In order to properly guide the body as it is presented to the boring-tool, I fix upon a stationary support, T, a horizontal body, K, the forward end of which is provided with a rest, N, adapted to bear against the surface of the brush-body. The bar K slides horizontally through guides L L', and is provided with a threaded arm or screw, M, which passes through the guide L and is secured by adjusting-nuts, as shown in Figs. 1 and 3. By turning these nuts the bar K may be moved forward and backward as required. The rest N has a threaded shank extending transversely through the bar K, and provided with a clamping-arm, as shown, so that its operative end may be adjusted transversely of the bar K, as the varying diameter of the brush-bodies may demand. The body supported by the rod J and guided by the rest N is further controlled by the hands of the operator, who forces it against the boring-tool until a hole of proper depth is formed, after which he draws it from the tool, gives it a partial rotation in a horizontal direction, and again presents it to the tool for the formation of the next hole, and so on repeatedly. The body is preferably provided, previous to its introduction to the apparatus, with vertical lines properly placed to indicate the horizontal distance between the holes, and thus guide the operator in its application to the boring-tool. After the completion of a row of holes around the circumference of the body it is then to be raised or lowered a proper distance to admit of the next row or line being formed. In order that the operator may thus adjust the body vertically and to the exact position required, I mount on the worm-shaft E' a sprocket-wheel, e, from which an endless chain, e', is extended downward around a sprocket-wheel, o', turning on a pivot-bolt, o, adjustably secured to a vertically-slotted arm, O, on the under side of the bar K. By moving this chain the operator is enabled to operate the worm-wheel, and through the intermediate parts to raise or lower the rod J and the brush-body, as before explained. To an arm on the bar K, I secure an upright screw-rod, P, lying parallel with one side of the chain, and on this rod I mount a loosely-sliding sleeve or hand-piece, Q, provided with a rib or feather entering a longitudinal slot in the rod, as shown in Fig. 1, whereby it is prevented from turning round the same. I provide this sleeve in one side with a pivoted finger, q, urged outward by a spring, q', and fashioned at its free end to engage the links of the chain. On the upper end of the rod I mount an adjustable nut, p, to limit the upward movement of the sleeve. When it is required to adjust the brush-body vertically, the operator moves the sleeve Q upward until its movement is arrested by the nut p, whereupon he presses the finger q inward until it engages the chain, and, holding it in engagement, moves it downward to the lower end of the rod, thereby operating the chain E' and adjusting the body, as before explained. The nut p, acting as a stop, secures equal movements of the chain and equal adjustments of the brush-body. By turning the nut p downward and diminishing the movement of the chain the holes in the brush-body will be brought nearer together, and vice versa.

The horizontal movement of the suspending devices upon the slide A is advantageous in that it permits the spindle to hang normally at any required distance from the end of the boring-tool. In this manner the apparatus may be adjusted to receive and hold in the required relation to the boring-tool brush-bodies of different diameters, and also of the bodies being suspended in such manner that the holes may be bored at any required angle to the axis of the body.

Having thus described my invention, what I claim is—

1. In a mechanism for supporting brush-bodies while being bored, the extensible pendulous spindle, a suspending-wire connected to the lower member of said spindle, the winding-drum for said wire, and the operating mechanism for said drum, substantially as described, whereby the lower end of the spindle is permitted to swing freely in a lateral direction and rendered capable of vertical adjustment at will.

2. In combination with a horizontal guide, the sliding frame B, the extensible spindle suspended therefrom by a universal joint, the winding-drum, the wire or chain suspending the lower member of the spindle from said drum, and mechanism, substantially as described, for turning the drum, whereby a brush-body may be supported, adjusted horizontally, raised and lowered, and permitted to swing laterally.

3. In combination with the extensible spindle, the suspending-wire, the winding-drum, the worm-gear for turning said drum, the endless chain and its supporting-links for operating the worm, the sleeve Q, for moving said chain, and an adjustable stud to limit the movement of the sleeve.

4. In a machine for boring brush bodies, and in combination with an overhead guide, the frame movable horizontally thereon, the frame-adjusting devices, and the pendent cord or belt for moving the same, and the pendent spindle to support the brush-body.

5. In combination with the rod J, the telescopic rods H and I, the supporting-frame B, and the gimbal-joint connecting the tube H with said frame, whereby the cylindrical brush-body may be held and guided, subject to longitudinal rotary and lateral movements.

6. In combination with the pendent brush-body, supporting-rod J, and the adjacent pulley $e$, for adjusting the same vertically, the adjustable bar K, provided with a rest to act against the brush-body, a pulley, $o'$, carried by said bar, and a connecting chain or belt, $e'$, extended from the pulley $o'$ to the pulley $e$, as described, whereby the parts are maintained in operative relation to each other, notwithstanding the changes in the position of the bar K.

7. In combination with the telescopic supporting-spindle and the adjusting-pulley $e$, connected thereto by intermediate mechanism, the chain $e'$, for operating the pulley, the rod P, provided with an adjustable stud, $p$, and the sliding sleeve Q, provided with the finger $q$, substantially as described.

8. In combination with the pendent brush-body supporting-spindle, the longitudinally-adjustable bar K, and the rest N, transversely adjustable on said bar, as described.

9. In combination with a boring-machine, R, having a tool, $r$, a pendent spindle adapted to sustain a cylindrical brush-body in front of said tool, and a guide or support, K, adapted to bear against the periphery of the brush-body, substantially as described.

In testimony whereof I have hereto set my hand in the presence of two subscribing witnesses.

J. V. GANE.

Witnesses:
  HARRY B. BRIDGE,
  W. RICHARDSON.